(12) United States Patent
Song et al.

(10) Patent No.: US 9,537,809 B2
(45) Date of Patent: Jan. 3, 2017

(54) METHOD AND SYSTEM FOR GRAPHIC CODE PROCESSING

(71) Applicant: Tencent Technology (Shenzhen) Company Limited, Shenzhen (CN)

(72) Inventors: Zhigang Song, Shenzhen (CN); Maocai Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/991,746

(22) Filed: Jan. 8, 2016

(65) Prior Publication Data

US 2016/0127293 A1 May 5, 2016

Related U.S. Application Data

(63) Continuation of application No. PCT/CN2014/091836, filed on Dec. 21, 2014.

(30) Foreign Application Priority Data

Dec. 17, 2013 (CN) .......................... 2013 1 0695578

(51) Int. Cl.
*G06K 7/00* (2006.01)
*G06K 7/10* (2006.01)
*H04L 12/58* (2006.01)

(52) U.S. Cl.
CPC ...................... *H04L 51/18* (2013.01)

(58) Field of Classification Search
CPC .......................... G06F 17/30879; H04L 51/18
(Continued)

(56) References Cited

U.S. PATENT DOCUMENTS 9,047,385 B1 * 6/2015 Malkin ............. G06F 17/30879
2002/0143643 A1 * 10/2002 Catan ..................... G06Q 30/06
235/375

(Continued)

FOREIGN PATENT DOCUMENTS

CN 101187974 A 5/2008
CN 102999860 A 3/2013
(Continued)

OTHER PUBLICATIONS

Tencent Technology, ISRWO, PCT/CN2014/091836, Mar. 2, 2015, 8 pgs.

(Continued)

*Primary Examiner* — Laura Gudorf
(74) *Attorney, Agent, or Firm* — Morgan, Lewis & Bockius LLP

(57) ABSTRACT

A method and system for processing graphical codes are disclosed. A device with one or more processors and memory obtains a respective graphic code (e.g., a QR code, barcode, SKU or the like) and identifies an operation corresponding to the respective graphic code. The device detects a trigger condition for diverting from a default processing procedure for executing the operation corresponding to the respective graphic code. In response to detecting the trigger condition, the device: delays execution of the operation corresponding to the respective graphic code; and stores at least one of the respective graphic code and data decoded from the respective graphic code in a graphic code library, where the graphic code library includes zero or more previously obtained graphic codes distinct from the respective graphic code or corresponding data decoded from the zero or more previously obtained graphic codes.

20 Claims, 12 Drawing Sheets

(58) Field of Classification Search
USPC .......................................... 235/435, 462.01
See application file for complete search history.

(56) References Cited

U.S. PATENT DOCUMENTS

2012/0048937 A1* 3/2012 Dahari ..................... G06K 7/14
                                                        235/462.08
2013/0181054 A1* 7/2013 Durham ............. G06K 7/10544
                                                        235/462.41

FOREIGN PATENT DOCUMENTS

CN         103324903    A    9/2013
WO    WO 2004063968   A2    7/2004

OTHER PUBLICATIONS

Tencent Technology, IPRP, PCT/CN2014/091836, Jun. 21, 2016, 6 pgs.

* cited by examiner

METHOD AND SYSTEM FOR GRAPHIC CODE PROCESSING

PRIORITY CLAIM AND RELATED APPLICATIONS

This application is a continuation application of PCT Patent Application No. PCT/CN2014/091836, entitled "METHOD AND SYSTEM FOR GRAPHIC CODE PROCESSING" filed on Dec. 21, 2014, which claims priority to Chinese Patent Application No. 201310695578.9, entitled "METHOD AND SYSTEM FOR STORING GRAPHIC CODES," filed on Dec. 17, 2013, both of which are incorporated by reference in their entirety.

FIELD OF THE TECHNOLOGY

The present disclosure relates to the field of computer data processing technologies, and in particular, to a method and system for graphic code processing.

BACKGROUND

A graphic code is a black and white image formed by distributing specific geometric figures on a plane according to a particular encoding procedure, where the image carries various content data. With the rapid development of mobile Internet, information broadcasting or sharing by using graphic codes has become more widespread. Currently, the most commonly used graphic code is a two-dimensional code that can be used as an entry to a mobile Internet application as well as a simple information carrier.

A common scenario for using a graphic code follows: A mobile application client executing on a mobile device has a graphic code scanning function. The user of the mobile device scans a graphic code by using a camera of the mobile device, and then the mobile application client parses content data carried in the graphic code. Subsequently, the mobile application client accesses a network according to the content data, and executes a preset operation on the content data. For example, the mobile application client, which is a social networking program, obtains a graphic code so as to add a person as a contact in the social networking program. Continuing with this example, the mobile application client parses the graphic code to determine an identity of the person carried in the graphic code and adds the person as a contact in the social networking program. In most scenarios, after parsing the graphic code to obtain corresponding content data, the mobile application client needs to access the network to execute a preset operation on the content data. However, when the network is congested or there is no network, the mobile application client cannot execute the present operation on the graphic code.

SUMMARY

In some embodiments, a method of graphic code processing is performed at a device (e.g., client device 104, FIGS. 1 and 3) with one or more processors and memory. The method includes obtaining a respective graphic code (e.g., a QR code, barcode, SKU, or the like) and identifying an operation corresponding to the respective graphic code. The method includes detecting a trigger condition for diverting from a default processing procedure for executing the operation corresponding to the respective graphic code. In response to detecting the trigger condition for diverting from the default processing procedure for executing the operation corresponding to the respective graphic code, the method includes: delaying execution of the operation corresponding to the respective graphic code; and storing at least one of the respective graphic code and data decoded from the respective graphic code in a graphic code library, where the graphic code library includes zero or more previously obtained graphic codes distinct from the respective graphic code or corresponding data decoded from the zero or more previously obtained graphic codes In some embodiments, a computing device (e.g., client device 104, FIGS. 1 and 3) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., client device 104, FIGS. 1 and 3) with one or more processors, cause the computer system to perform, or control performance of, the operations of any of the methods described herein. In some embodiments, a computing device (e.g., client device 104, FIGS. 1 and 3) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
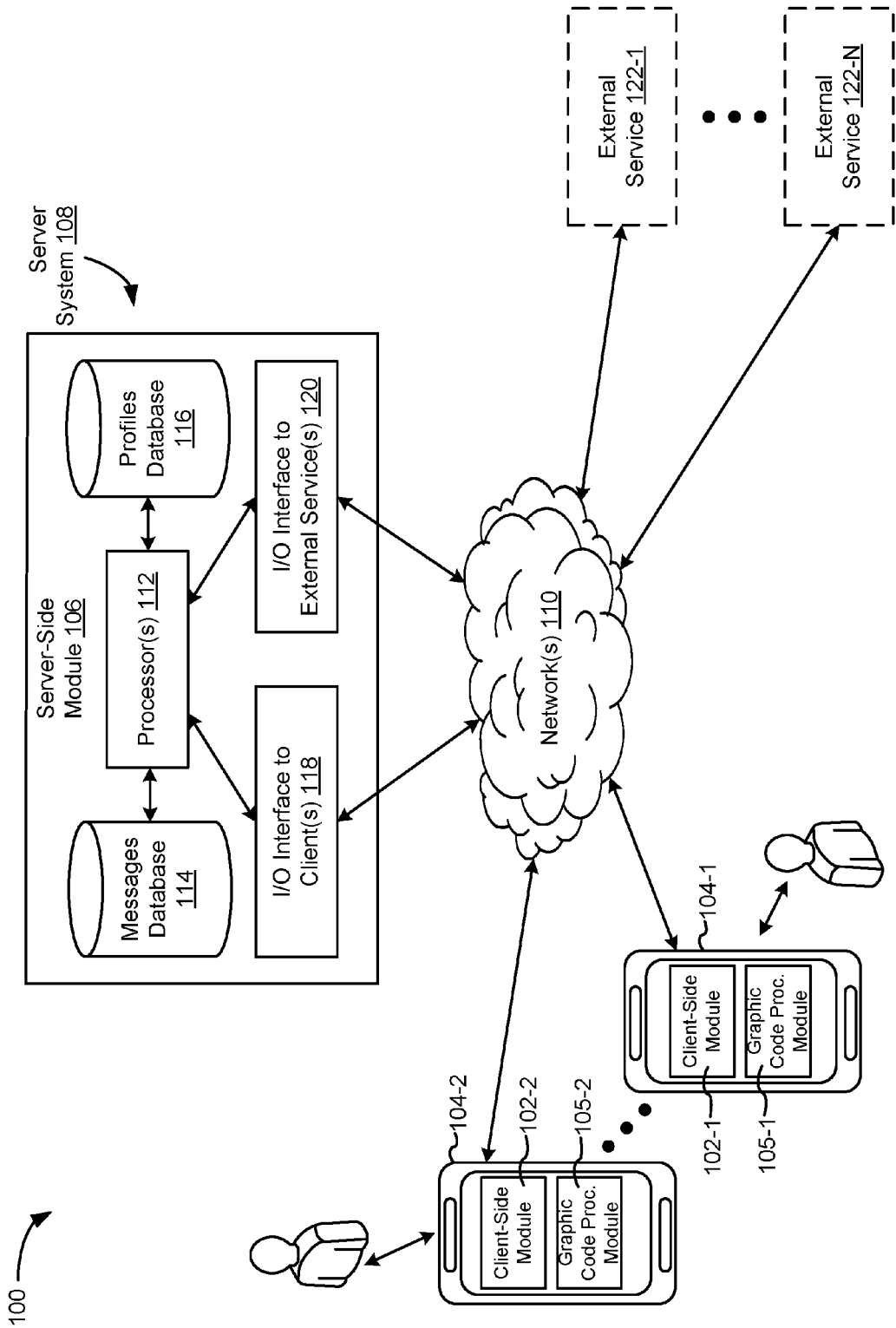
FIG. 1 is a block diagram of a server-client environment in accordance with some embodiments.

As shown in FIG. 1, data processing for a social networking platform or other application is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., communications, payment processing, user authentication, etc.) and communications with server-side module 106. Server-side module 106 provides server-side functionalities for the social networking platform (e.g., communications, payment processing, user authentication, etc.) for any number of client modules 102 each residing on a respective client device 104.

In some embodiments, client devices 104 also include a graphic code processing module 105 which obtains a respective graphic code (e.g., a QR code, barcode, SKU, or the like) and determines an operation corresponding the respective graphic code (e.g., adding a friend/contact in the social networking platform, following a public account in the social networking platform, processing a payment, or opening a link). For example, the user of client device 104 captures the respective graphic code with an internal or external camera of client device 104. In another example, the user of client device 104 receives the respective graphic code shared by another user.

In accordance with a determination that a trigger condition is not detected, graphic code processing module 105 performs a default processing procedure for executing the operation corresponding to the respective graphic code. In accordance with a determination that trigger condition is detected, graphic code processing module 105 delays execution of the operation corresponding to the respective graphic code and stores at least one of the respective graphic code and data decoded from the respective graphic code in a graphic code library (i.e., graphic code library 372, FIG. 3), where the graphic code library includes zero or more previously obtained graphic codes distinct from the respective graphic code or corresponding data decoded from the zero or more previously obtained graphic codes.

In some embodiments, graphic code processing module 105 is a standalone application separate from client-side module 102. For example, if the operation corresponding to the respective graphic code is associated with the social networking platform (e.g., adding a friend/contact in the social networking platform or following a public account in the social networking platform), graphic code processing module 105 sends the respective graphic code to client-side module 102 for handling when executing the operation corresponding to the respective graphic code. In some embodiments, graphic code processing module 105 is a component or feature of client-side module 102. For example, after executing the client-side module 102, the user of client device 104 may select a graphic code capturing and processing feature (e.g., graphic code processing module 105).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

In some embodiments, server-side module 106 includes one or more processors 112, messages database 114, profiles database 116, an I/O interface to one or more clients 118, and an I/O interface to one or more external services 120. I/O interface to one or more clients 118 facilitates the client-facing input and output processing for server-side module 106. One or more processors 112 perform operations for the social networking platform, such as adding a contact to a respective user's contact list or following a public account, in response to a request from a user of the social networking platform. Messages database 114 stores messages sent by users in the social networking platform, and profiles database 116 stores a user profile for each user of the social networking platform. I/O interface to one or more external services 120 facilitates communications with one or more external services 122 (e.g., media content hosting services, merchant websites, credit card companies, and/or other payment processing services).

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108). In another example, client-side module 102 performs the verification process and a backend server (e.g., server system 108) performs other functions of the social networking platform (e.g., communications and payment processing).

Figure 2:
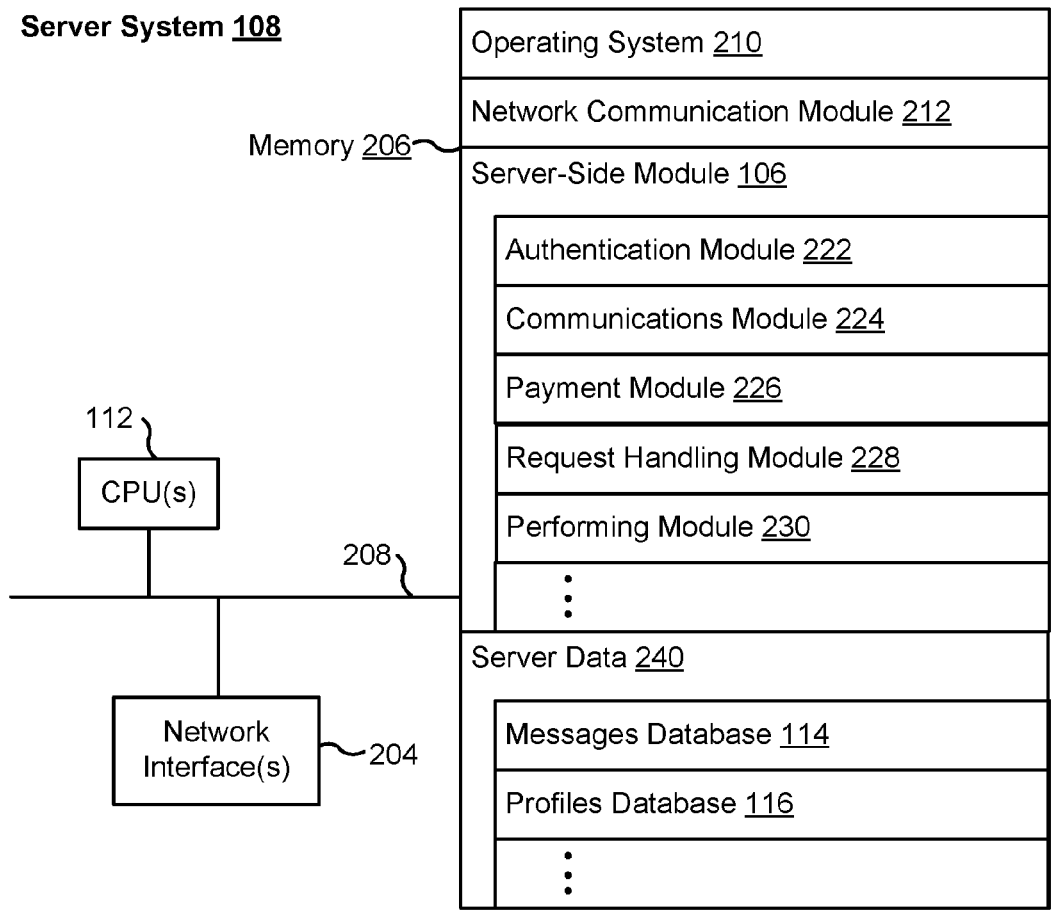
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and external service(s) 122) connected to one or more networks 110 via one or more network interfaces 204 (wired or wireless);
- server-side module 106, which provides server-side data processing and functionalities for the social networking platform, including but not limited to:
  - authentication module 222 for authenticating users of client devices 104 to access the social networking platform;
  - communication system 224 for routing message sent by users of the social networking platform;
  - (optionally) payment module 226 for processing payments associated with transactions initiated by users of client devices 104;
  - request handling module 228 for receiving requests from users of the social networking platform (e.g., to add a contact or follow a public account); and
  - performing module 230 for performing an operation in response to a request from a user of the social networking platform (e.g., add a contact to the user's contact list or follow a public account); and
- server data 240 storing data, including but not limited to:
  - messages database 114 storing messages sent by users in the social networking platform; and
  - profiles database 116 storing user profiles for users of the social networking platform, where a respective user profile for a user includes a user identifier (e.g., an account name or handle), login credentials to the social networking platform, (optionally) payment data (e.g., linked credit card information, app credit or gift card balance, billing address, shipping address, etc.), an IP address or preferred contact information, contacts list, custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
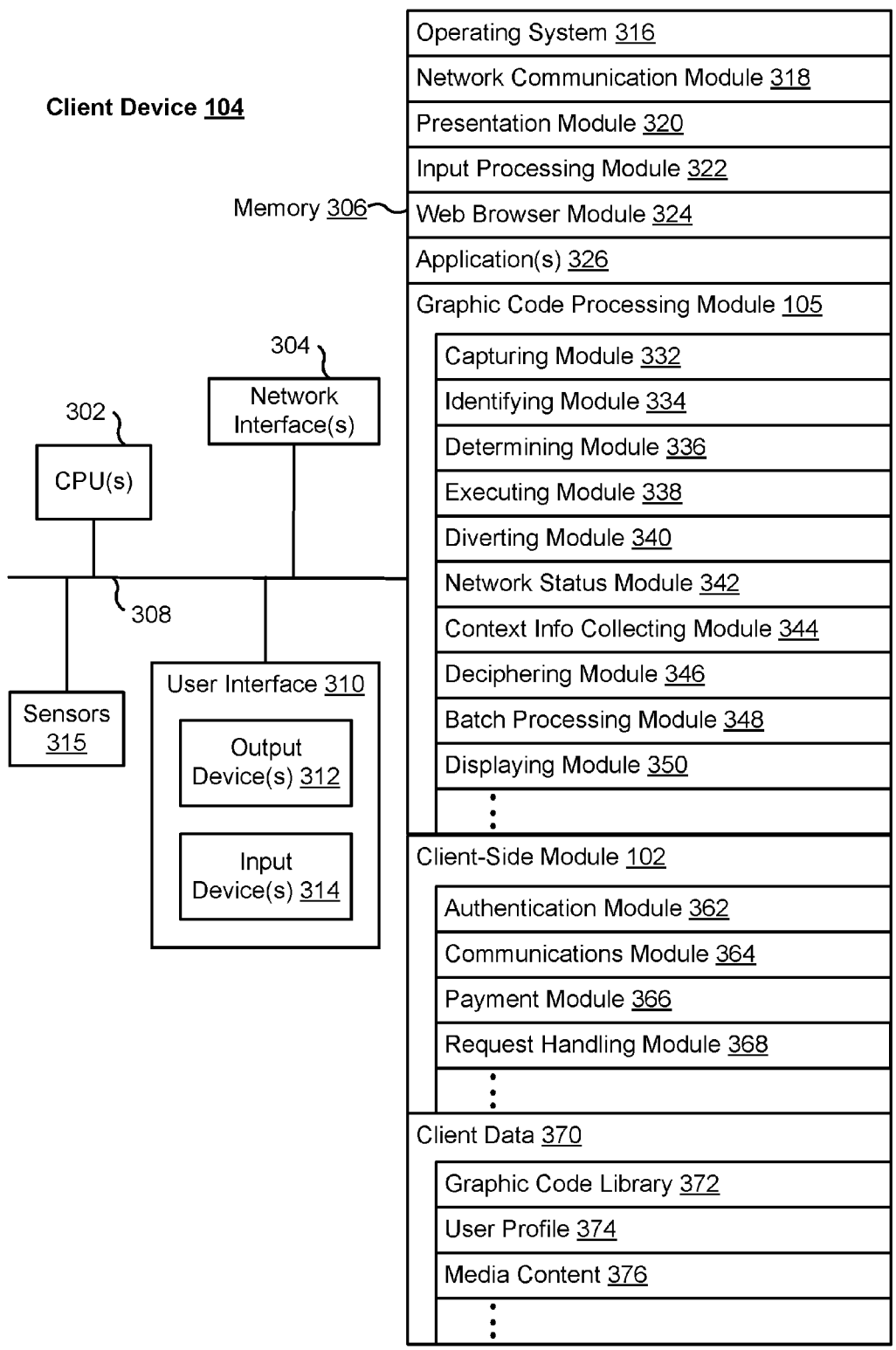
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard. Client device 104 further includes sensors 315, which provide context information as to the current state of client device 104 or the environmental conditions associated with client device 104. Sensors 315 include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;

network communication module 318 for connecting client device 104 to other computing devices (e.g., server system 108 and external service(s) 122) connected to one or more networks 110 via one or more network interfaces 304 (wired or wireless);

presentation module 320 for enabling presentation of information (e.g., a user interface for application(s) 326 or the recording application when executed in the foreground, widgets, websites and web pages thereof, and/or games, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

web browser module 324 for navigating, requesting (e.g., via HTTP), and displaying websites and web pages thereof;

one or more applications 326 for execution by client device 104 (e.g., games, application marketplaces, payment platforms, and/or other applications);

graphic code processing module 105 for capturing and processing graphic codes, including but not limited to:
   capturing module 332 for capturing an image of a graphic code with the camera of client device 104;
   identifying module 334 for identifying an operation corresponding to the graphic code (e.g., adding a friend/contact, following a public account, processing a payment, opening a link to website, or the like);
   determining module 336 for determining whether a trigger condition is present;
   executing module 338 for executing the identified operation corresponding to the graphic code in accordance with a determination that the trigger condition is not present;
   diverting module 340 for delaying execution of the identified operation corresponding to the graphic code and storing the graphic code in graphic code library 372 in accordance with a determination that the trigger condition is present;
   network status module 342 for determining whether the network status of network communication module 318 satisfies one or more predetermined criteria and for monitoring the network status of network communication module 318;
   context information collecting module 344 for collecting context information associated with a current state of client device 104 from one or more sensors 315 and other sources;
   deciphering module 346 for deciphering at least a portion of information encoded in the graphic code;
   batch processing module 348 for performing a batch processing function on two or more graphic codes; and
   displaying module 350 for displaying at least a portion of the graphic code(s) stored in graphic code library 372;

client-side module 102, which provides client-side data processing and functionalities for the social networking platform, including but not limited to:
   authentication module 362 for authenticating the user of client device 104 to access the social networking platform;
   communication system 364 for sending messages to and receiving messages from other users of the social networking platform (e.g., instant messaging, group chat, message board, message/news feed, and the like);
   (optionally) payment processing 366 for processing payments associated with transactions initiated within the social networking platform or at a merchant's website within web browser module 324; and
   request handling module 368 for sending a request to server system 108 to execute an operation for the social networking platform (e.g., adding a contact or follow a public account in the social networking platform); and client data 370 storing data, including, but is not limited to:
   graphic code library 372 storing one or more graphic codes captured by capturing module 332 or received from an external source;
   user profile 374 storing a user profile associated with the user of client device 104 for the social networking platform including a user identifier (e.g., an account name or handle), login credentials to the social networking platform, (optionally) payment data (e.g., linked credit card information, app credit or gift card balance, billing address, shipping address, etc.), an IP address or preferred contact information, contacts list, custom parameters for the user (e.g., age, location, hobbies, etc.), and identified trends and/or likes/dislikes of the user; and
   user data 376 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of graphic code processing module 105 are performed by client-side module 102. As such, graphic code processing module 105 may be a component of, or function performed by, client-side module 102. For example, graphic code processing module 105 is a component or feature of client-side module 102.

In some embodiments, at least some of the functions of the client-side module 102 are performed by the server-side module 106, and the corresponding sub-modules of these functions may be located within the server-side module 106 rather than the client-side module 102. In some embodiments, at least some of the functions of the server-side module 106 are performed by the client-side module 102, and the corresponding sub-modules of these functions may be located within the client-side module 102 rather than the server-side module 106. Server system 108 and client device 104 shown in FIGS. 2-3, respectively, are merely illustrative, and different configurations of the modules for implementing the functions described herein are possible in various embodiments.

Figure 4:
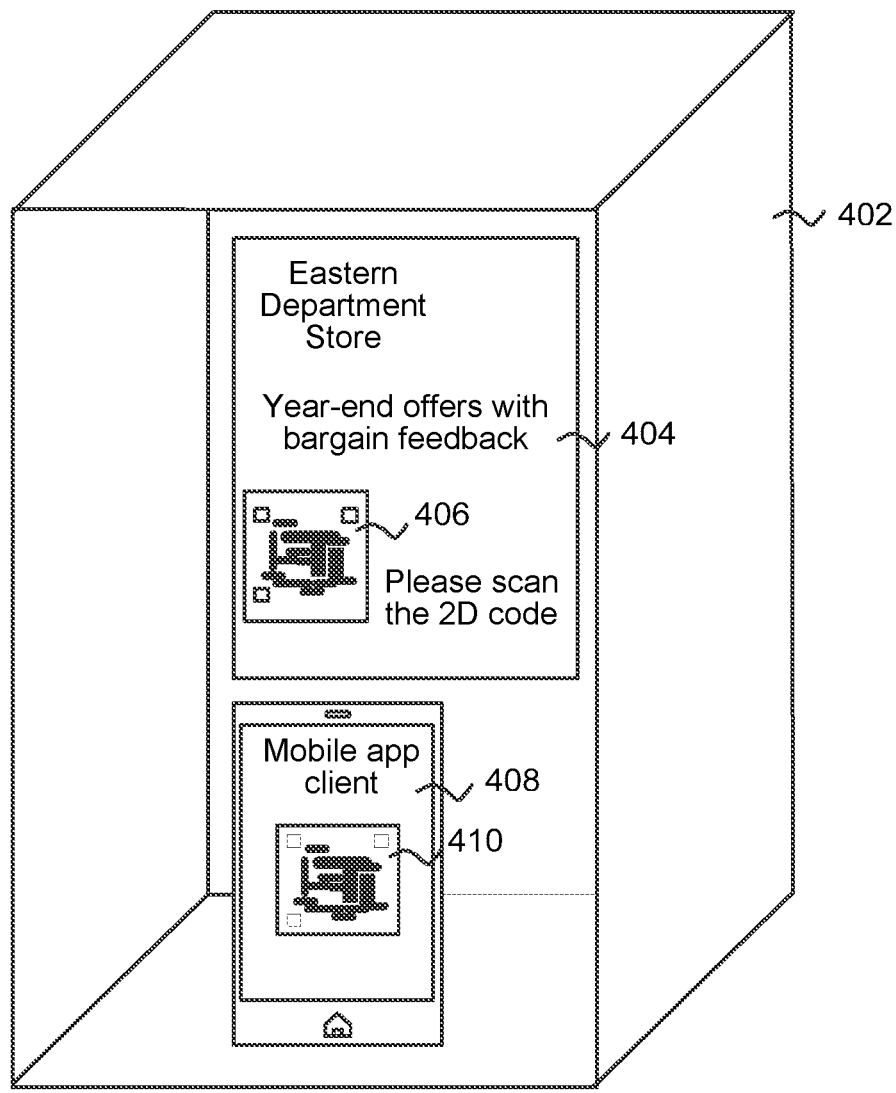
FIG. 4 illustrates an example scenario for graphic code saving in accordance with some embodiments.

FIG. 4 illustrates an example scenario for graphic code saving in accordance with some embodiments. In FIG. 4, an advertisement 404 is pasted to a wall 402 of an elevator, and a graphic code 406 is published on the advertisement paper 404. In FIG. 4, graphic code 406 is a two-dimensional code corresponding to a public account of a shopping mall (e.g., Eastern Department Store). For example, a user executes a mobile application client on his/her mobile phone 408 (e.g., client device 104, FIGS. 1 and 3) and subsequently uses the mobile application client to scan graphic code 406 by using a built-in camera of mobile phone 408. Continuing with this example, if mobile phone 408 has a network connection, the mobile application client automatically executes an operation corresponding to graphic code 406 (e.g., following the public account of the shopping mall in the social networking platform). However, if the network connection of mobile phone 408 is poor or unavailable, the mobile application client automatically saves graphic code 406 to a graphic code library (e.g., graphic code library 372, FIG. 3).

In the following specific application scenarios, description is made by using an example in which the graphic code is the two-dimensional code; however, this is not meant to be limiting and any other form of graphic code could be used as understood by one of ordinary skill in the art.

In a first application scenario, a user sees a two-dimensional code for following a public account of a merchant while walking at a mall, and the user scans the two-dimensional code by using a camera of the user's mobile phone. When attempting to use the two-dimensional code, the mobile application client determines that the mobile device has no network connection, and then the mobile application client prompts the user to save the two-dimensional code, or automatically saves the two-dimensional code. When the mobile application client detects that the network is available, the mobile application client automatically follows the public account (or follows the public account after confirmation by the user).

In a second application scenario, a user sees a two-dimensional code for a shopping link to a merchant's website while reading a newspaper, and the user scans the two-dimensional code by using a camera of the user's mobile phone. When attempting to use the two-dimensional code, the mobile application client determines that the network is congested (e.g., the download/upload speeds are low or bandwidth availability is low), and then the mobile application client prompts the user to save the two-dimensional code. Correspondingly, the mobile application client saves the two-dimensional code in a graphic code library of the mobile application client. When the mobile application client detects that the network is not congested, the mobile application client prompts the user to open the shopping link corresponding to the two-dimensional code. After opening the shopping link, the user is able to view goods corresponding to the shopping link and subsequently perform an operation such as buying the goods.

In a third application scenario, a user sees a two-dimensional code for payment while attempting to complete an online transaction, and the user scans the two-dimensional code by using a camera of the user's mobile phone When attempting to use the two-dimensional code, the mobile application client determines that the mobile device has no network connection, and then the mobile application client prompts the user to save the two-dimensional code. Correspondingly, the mobile application client saves the two-dimensional code in a graphic code library of the mobile application client. When the mobile application client detects that the network is available, the mobile application client displays prompt information to prompt the user to complete the payment operation.

Attention is now directed towards embodiments of user interfaces and associated processes that may be implemented on a client device 104 with one or more speakers, one or more microphones, and a touch screen (sometimes also herein called a "touch screen display") enabled to receive one or more contacts and display information (e.g., media content, websites and web pages thereof, and/or user interfaces for application(s) 326). FIGS. 5A-5D illustrate exemplary user interfaces for saving and processing graphic codes in accordance with some embodiments.

FIGS. 5A-5D show interface displayed on client device 104 (e.g., a mobile phone) for graphic code processing module 105 (FIGS. 1 and 3) (sometimes also herein called a "mobile application client"); however, one skilled in the art will appreciate that the user interfaces shown in FIGS. 5A-5D may be implemented on other similar computing devices. The user interfaces in FIGS. 5A-5D are used to illustrate the processes described herein, including the process described with respect to FIGS. 6-7 and 8A-8C.

Figure 5A:
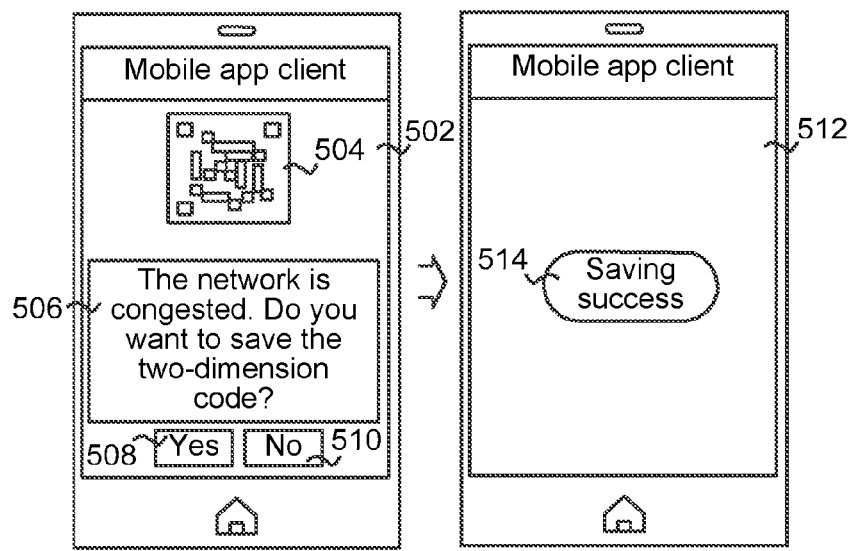
FIGS. 5A-5D illustrate exemplary user interfaces for graphic code saving and processing in accordance with some embodiments.

In FIG. 5A, client device 104 displays prompt box 506 on user interface 502 of the mobile client application, which queries the user whether to save graphic code 504 (e.g., a two-dimensional code). In FIG. 5A, user interface 502 also includes "Yes" option 508 and "No" option 510, which enable the user of client device 104 to choose whether to save graphic code 504. For example, if the user chooses "Yes" option 508, the mobile application client saves graphic code 504. After saving graphic code 504, the mobile application client displays prompt 514 on user interface 512 indicating that the saving was successful.

Figure 5B:
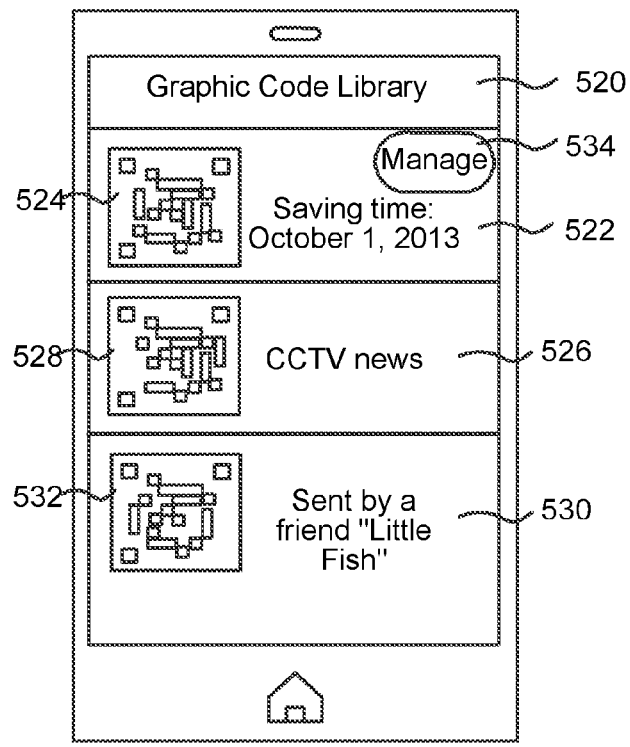

In FIG. 5B, client device 104 displays a graphic code library 520 of the mobile application client. In FIG. 5B, graphic code library 520 includes a first saved graphic code 524, a second saved graphic code 528, and a third saved graphic code 532. In FIG. 5B, graphic code library 520 also includes an obtaining time 522 for the first graphic code 524, description information 526 corresponding to the second graphic code 528, and description information 530 corresponding to the third graphic code 532. In FIG. 5B, the user of client device 104 is also able to manage saved graphic codes 524, 528, and 532 in graphic code library 520 via manage button 534. For example, manage button 534 enables the user of client device 104 to reorder, prioritize, change the related information, delete, or execute the saved graphic codes.

Figure 5C:
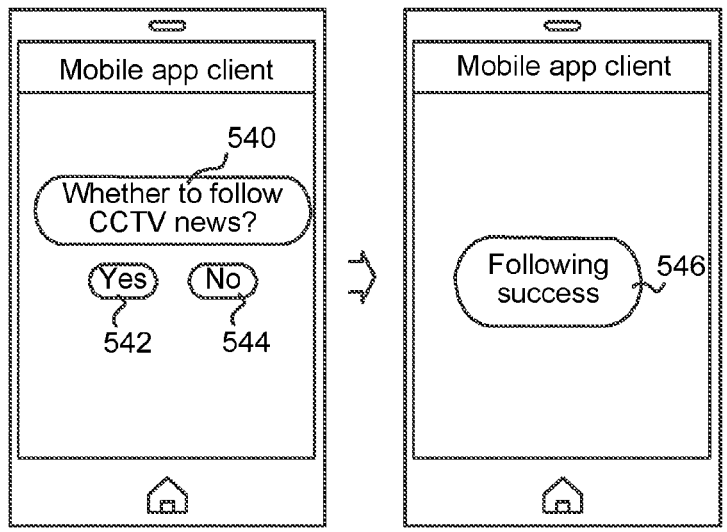

In FIG. 5C, client device 104 displays prompt 540 on the interface of the mobile application client. In FIG. 5C, prompt 540 queries the user of client device 104 "Whether to follow CCTV news?" In FIG. 5C, the user interface of the mobile application client also includes "Yes" option 542 and "No" option 544 for the user to choose whether to follow CCTV news. For example, if the user chooses "Yes" option 542, the mobile application client follows CCTV news. In FIG. 5C, the mobile application client subsequently displays prompt 546 on user interface indicating that the following was successful.

Figure 5D:
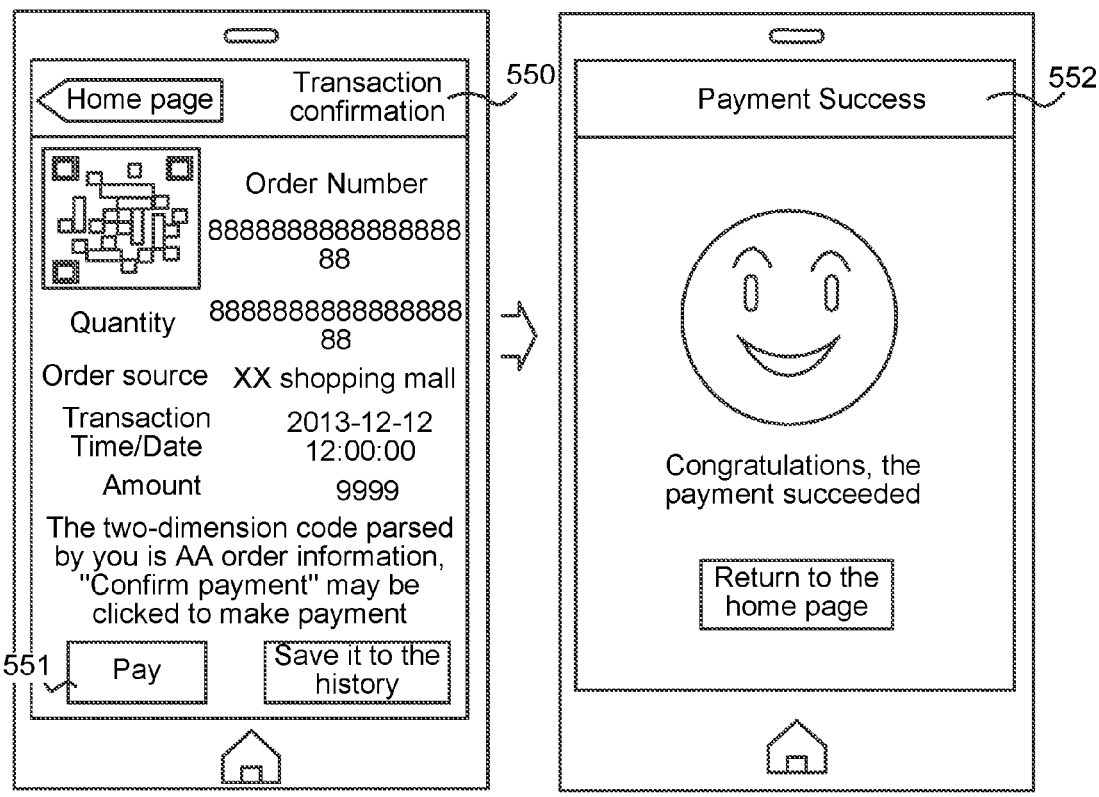

In FIG. 5D, the graphic code includes payment information for a transaction, and the mobile application client displays an interface 550 prompting the user of client device 104 to confirm the submitted payment information. If the user submits the payment information (e.g., by selecting "Pay" button 551) the mobile application client completes the payment operation. In FIG. 5D, after completing the payment operation, the mobile application client displays an interface 552 indicating that the payment was successful.

Figure 6:
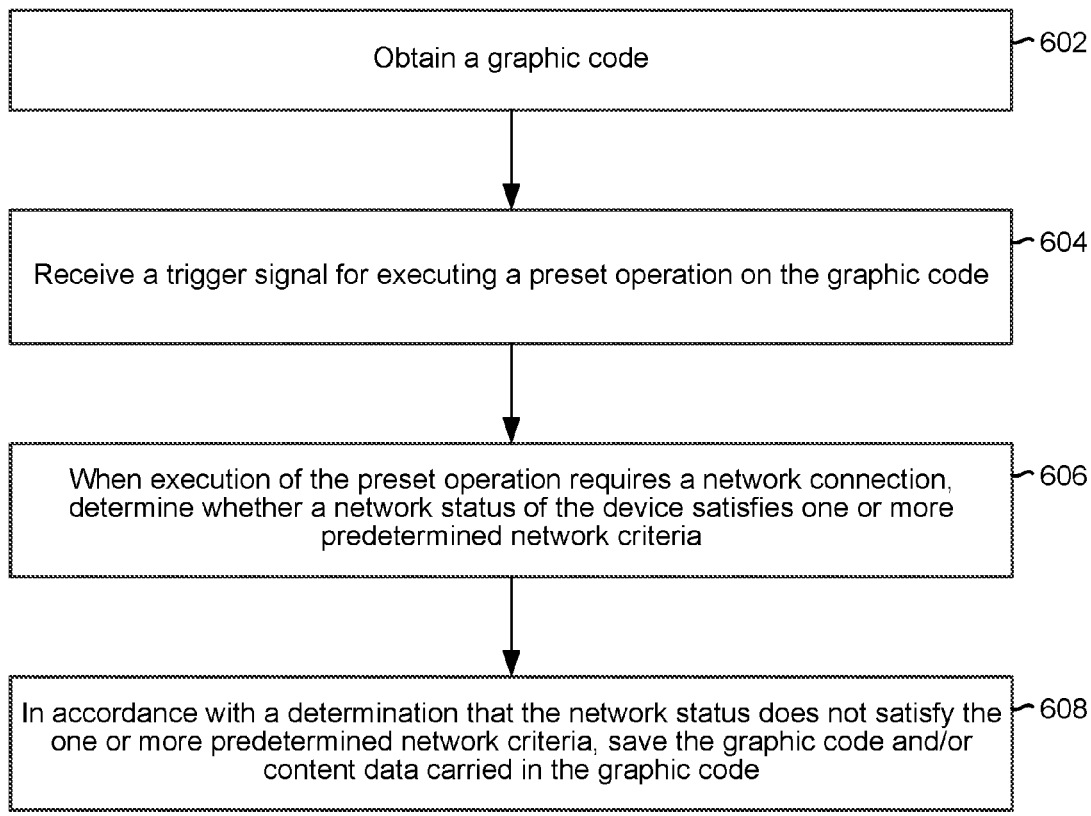
FIG. 6 illustrates a flowchart diagram of a method of graphic code saving in accordance with some embodiments.

FIG. 6 illustrates a flowchart diagram of a method 600 of graphic code saving in accordance with some embodiments.

In some embodiments, method 600 is performed by a device with one or more processors and memory. For example, in some embodiments, method 600 is performed by client device 104 (FIGS. 1 and 3) or a component thereof (e.g., graphics code processing module 105, FIGS. 1 and 3). In some embodiments, method 600 is governed by instructions that are stored in a non-transitory computer readable storage medium and the instructions are executed by one or more processors of the device.

In some embodiments, the device described in this specification (i.e., client device 104, FIGS. 1 and 3) generally includes a mobile terminal having a camera. The mobile terminal is installed with a mobile application client, and the mobile application client is an application program (sometimes also herein called the "app") having functions of scanning, identifying, and saving graphic codes. In some embodiments, the mobile terminal is one of: a smart phone, a tablet computer, an ultra-book, an e-book reader, a Moving Picture Experts Group Audio Layer III (MP3) player, a Moving Picture Experts Group Audio Layer IV (MP4) player, a laptop portable computer, and the like. In some embodiments, the "camera" mentioned in this specification is a built-in camera of the mobile terminal.

The device obtains (602) a graphic code. In some embodiments, the graphic code is a two-dimensional code that is capable of carrying data information. For example, the graphic code is a QR code, barcode, SKU, or the like. In some embodiments, the graphic code is encoded with the data information according to a predetermined procedure. In some embodiments, the user of the device captures the graphic code using a camera of the device. In some embodiments, the graphic code is received (e.g., via an e-mail, an SMS, a message or post sent through the social networking platform, or the like) from another user.

The device receives (604) a trigger signal for executing a preset operation on the graphic code.

When execution of the preset operation requires a network connection, the device determines (606) whether a network status of the device satisfies one or more predetermined network criteria. For example, the one or more predetermined network criteria are satisfied when the network status of the device indicates that the device is connected to the network (i.e., the Internet) via a predefined connection protocol (e.g., Wi-Fi or LTE, but not 3G or EDGE) or a predefined connection strength (e.g., signal strength greater than or equal to −T db (where T is a predetermined threshold number) or full bars).

In accordance with a determination that the network status does not satisfy the one or more predetermined network criteria, the device saves (608) the graphic code and/or content data carried in the graphic code. For example, client device 104 or a component thereof (e.g., graphic code processing module 105, FIG. 3) saves the graphic code and/or content data carried in the graphic code in graphic code library 372 (FIG. 3).

In conclusion, in method 600 provided in this embodiment, the graphic code is saved when the network is congested or when there is no network. As such, utilization of the graphic code is improved, and the user is provided with great convenience.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIG. 6.

Figure 7:
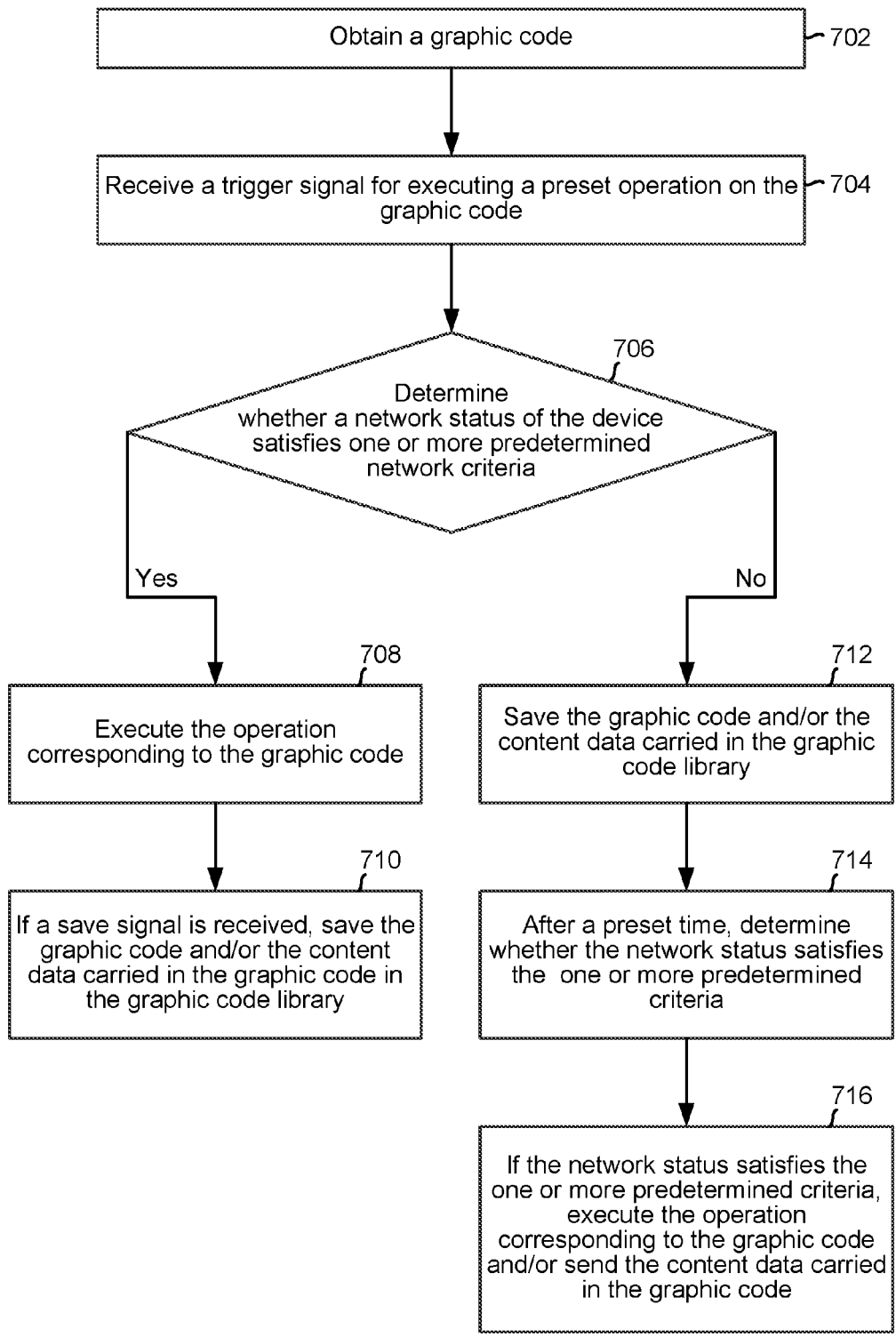
FIG. 7 illustrates a flowchart diagram of a method of graphic code saving in accordance with some embodiments.

FIG. 7 illustrates a flowchart diagram of a method 700 of graphic code saving in accordance with some embodiments. In some embodiments, method 700 is performed by a device with one or more processors and memory. For example, in some embodiments, method 700 is performed by client device 104 (FIGS. 1 and 3) or a component thereof (e.g., graphics code processing module 105, FIGS. 1 and 3). In some embodiments, method 700 is governed by instructions that are stored in a non-transitory computer readable storage medium and the instructions are executed by one or more processors of the device.

The device obtains (702) a graphic code. In some embodiments, a mobile application client (e.g., graphic code processing module 105, FIG. 3) executed on the device (sometimes also herein called a "mobile terminal") obtains the graphic code. In some embodiments, the graphic code is a two-dimensional code that is capable of carrying data information. As applications for the graphic code become wider, adopted representations of the graphic code will become more abundant. In other words, representations of the graphic code other than the two-dimensional code will become commonplace. In some embodiments, the mobile application client is configured to scan, identify, and save the graphic code. Specifically, the mobile application client obtains the graphic code in the following two manners.

In the first manner, the mobile application client obtains the graphic code by using a camera of the device. For example, the mobile application client scans (e.g., by using a camera of the device) traditional media (e.g., magazines and advertisements) or digital media, (e.g., pictures and websites) so as to obtain the graphic code. Generally, the camera is built into the device; however, the camera may also be external to the device (e.g., the camera is a peripheral such as a web cam). In some embodiments, the mobile application client also obtains a time/date and a location when capturing the graphic code. Even if the device does not have a network connection, the mobile application client is able to obtain the graphic code by using the built-in camera of the device.

In a second manner, the mobile application client receives the graphic code sent by another device over the network (e.g., network(s) 110, FIG. 1).

The device receives (704) a trigger signal for executing a preset operation on the graphic code. In some embodiments, the mobile application client (e.g., graphic code processing module 105, FIG. 3) executed on the device receives the trigger signal to execute the preset operation corresponding to the graphic code when the user of the device user interacts with (e.g., clicks on) the graphic code. In some embodiments, the mobile application client (e.g., graphic code processing module 105, FIG. 3) executed on the device receives the trigger signal to execute the preset operation corresponding to the graphic code automatically after obtaining the graphic code. In some embodiments, the preset operation includes, but is not limited to: a following operation used for following a public account corresponding to the graphic code, a friend adding operation used for adding a user corresponding to the graphic code as a friend, a browsing operation used for opening a link corresponding to the graphic code, and a payment operation used for completing a payment process corresponding to the graphic code.

When execution of the preset operation requires a network connection, the device determines (706) whether a network status of the device satisfies one or more predetermined network criteria. For example, the network status of the device does not satisfy the one or more predetermined network criteria when the current network is congested (e.g., low upload/download speeds or low available bandwidth) or is unavailable (e.g., low or no signal strength). In some embodiments, the network status indicates whether the network is congested (e.g., measured by using network status parameters such as a network speed, channel occupation, bandwidth, or the like) or whether there is a network service. The preset condition is a condition used for measuring whether the network situation is good or poor, for example whether the network speed reaches a preset threshold or whether a channel occupation ratio is less than a preset threshold. In some embodiments, the network status is determined by another device and sent to the device.

In accordance with a determination that the network status of the device satisfies the one or more predetermined network, the device executes (708) the preset operation corresponding to the graphic code using the network. In some embodiments, the preset operation includes, but is not limited to: a following operation used for following a public account corresponding to the graphic code, a friend adding operation used for adding a user corresponding to the graphic code as a friend, a browsing operation used for opening a link corresponding to the graphic code, and a payment operation used for completing a payment process corresponding to the graphic code.

In accordance with a determination that a save signal is received, the device saves (710) the graphic code and/or content data carried in the graphic code in a preset local storage location (e.g., graphic code library 372, FIG. 3). After a user uses the graphic code, the user may choose to save the graphic code. Therefore, when receiving the save signal, the mobile application client saves, in a preset local storage location and/or in the preset network storage location, the graphic code and/or content data carried in the graphic code. That is, the mobile application client may automatically save the scanned graphic code in the preset local storage location and/or in the preset network storage location in a form of a picture, and may also automatically save, in text form in the preset local storage location and/or in the preset network storage location, the content data obtained after parsing the graphic code. For example, the preset local storage location may be: memory space or secure digital memory (sd) card storage space of the device (e.g., storage space of an album program of the mobile terminal), or storage space of the mobile application client. For example, the preset network storage location may be a third-party cloud-based storage provider (e.g., one of external services 122, FIG. 1 or server system 108 associated with the social networking platform) or a network hard drive related to the mobile application client.

In accordance with a determination that the network status of the device does not satisfy the one or more predetermined network, the device saves (712) the graphic code and/or the content data carried in the graphic code. In some embodiments, mobile application client saves the graphic code and/or the content data carried in the graphic code in the preset local storage location. For example, the preset local storage location may be: memory space or secure digital memory (sd) card storage space of the device (e.g., storage space of an album program of the mobile terminal), or storage space of the mobile application client.

When the network status of the device does not satisfy the one or more predetermined network, the mobile application client cannot reliably use the network connection (e.g., the network status indicates that the device has a low strength connection to the network) to immediately execute the preset operation on the graphic code, or cannot use network connection (e.g., the network status indicates that the device has no connection to the network) to execute the preset operation on the graphic code.

In some embodiments, when the network status of the device does not satisfy the one or more predetermined network, the mobile application client automatically saves the scanned graphic code in the preset local storage location (e.g., as an image) and/or may the mobile application client automatically saves the content data obtained from parsing the graphic code in the preset local storage location (e.g., in the form of an image). In some embodiments, when the network status of the device does not satisfy the one or more predetermined network, the mobile application client prompts the user of the device to save the scanned graphic code and/or the content data obtained from parsing the graphic code. For example, in FIG. 5A, client device 104 displays prompt box 506 on user interface 502 of the mobile client application, which queries the user whether to save graphic code 504 (e.g., a two-dimensional code). If the user chooses "Yes" option 508, the mobile application client saves graphic code 504. After saving graphic code 504, the mobile application client displays prompt 514 on user interface 512 indicating that the saving was successful.

In some embodiments, in addition to saving the graphic code and/or the content data carried in the graphic code, the mobile application client may also perform the following operations in the saving process:

As a first additional operation, the mobile application client obtains information related to the graphic code. In some embodiments, the related information includes at least one of: the time/date the graphic code was scanned/captured, the geographic location of the device when graphic code was scanned/captured (e.g., based on the GPS system of the device), description information of the graphic code, a data source of the graphic code, and a preset operation corresponding to the graphic code.

In some embodiments, the time/date the graphic code was scanned/captured and the geographic location of the device when graphic code was scanned/captured is obtained by the mobile application client on its own. In some embodiments, the description information of the graphic code is manually input by the user of the device or the description information of the graphic code is obtained by the mobile application client on its own. In some embodiments, the data source of the graphic code is obtained by analyzing context information when the mobile application client obtained the graphic code. In some embodiments, the preset operation corresponding to the graphic code is identified by the mobile application client on its own according to an operation instruction of the user, or the preset operation corresponding to the graphic code is set by the user of the device. For example, the preset operation is one of a following operation, a friend adding operation, a browsing operation, or a payment operation.

As a second additional operation, the mobile application client performs correlated storage on the information related to the graphic code and the saved graphic code and/or content data of the graphic code. In some embodiments, when saving the graphic code and/or the content data of the graphic code, the mobile application client performs correlated storage on the information related to the graphic code and the graphic code and/or the content data of the graphic code. For example, if the related information obtained by the mobile application client is the time the graphic code was scanned/captured, the mobile application client performs correlated storage on the obtaining time of the graphic code and the graphic code. In another example, the related information obtained by the mobile application client is the description information of the graphic code, the mobile application client performs correlated storage on the description information of the graphic code and the graphic code.

In some embodiments, after performing correlated storage on the information related to the graphic code and the graphic code and/or the content data of the graphic code, the mobile application client also displays at least one graphic code and/or the content data of the graphic code that are saved, and corresponding related information. For example, in FIG. 5B, client device 104 is displaying a graphic code library 520 of the mobile application client. In FIG. 5B, graphic code library 520 shows an obtaining time 522 for a first graphic code 524, description information 526 corresponding to a second graphic code 528, and description information 530 corresponding to a third graphic code 532.

In some embodiments, after a preset time, the device determines (714) whether the network status of the device satisfies the one or more predetermined network criteria. In some embodiments, after saving the graphic code and/or the content data of the graphic code, the mobile application client monitors the network status of the device so as to determine whether the network status of the device satisfies the one or more predetermined network criteria. For example, the mobile application client checks the network status the device every X seconds device so as to determine whether the network status of the device satisfies the one or more predetermined network criteria.

For example, although the network status of the device did not previously satisfy the one or more predetermined network criteria, the network status of the device may change over time or as the geographic location of the device changes. For example, when the user is in an elevator or a subway, the network status of the device is relatively poor; however, after exiting the elevator or subway and arriving at an office building or a restaurant having Wi-Fi, the network status of the device may be relatively good.

In some embodiments, in accordance with a determination that the network status of the device satisfies the one or more predetermined network criteria, the device executes (716) the preset operation on the saved graphic code and/or content data carried in the graphic code using the network.

The preset operation includes, but is not limited to, the following four cases:

In the first case, if the preset operation is the following operation, the mobile application client extracts an identity of a followed object from the saved graphic code and/or content data carried in the graphic code, and the mobile application client sends a following request with the extracted identity to a server by using the network. Subsequently, in some embodiments, the mobile application client receives a response from the server indicating whether the object was followed successfully.

In the second case, if the preset operation is the friend adding operation, the mobile application client extracts an identity of the to-be-added friend from the saved graphic code and/or content data carried in the graphic code, and the mobile application client sends a friend adding request with the extracted identity to the server by using the network. Subsequently, in some embodiments, the mobile application client receives prompt information from the server to complete the friend adding process.

In the third case, if the preset operation is the browsing operation, the mobile application client extracts a link (e.g., an address or URL) from the saved graphic code and/or content data carried in the graphic code, and the mobile application client sends a content obtaining request with the extracted link to the server by using the network. Subsequently, in some embodiments, the mobile application client receives the content corresponding to the link from the server, and the mobile application client presents the content corresponding to the link.

In the fourth case, if the preset operation is the payment operation, the mobile application client extracts payment information from the saved graphic code and/or content data carried in the graphic code, and the mobile application client sends a payment request with the extracted payment information to the server by using the network. Subsequently, in some embodiments, the mobile application client receives prompt information from the server to complete the payment process corresponding to the extracted payment information. Specifically, this step includes the following two scenarios:

In some embodiments, if device recognizes the present operation corresponding to the graphic code and/or content data, the mobile application client automatically uses the network to execute the preset operation. For example, if the stored graphic code is associated with a public account and the preset operation associated with following the public account is recognized by the mobile application client, the mobile application client automatically uses the network to follow the public account when the network status of the device satisfies the one or more predetermined network. In another example, if the stored graphic code is associated with a shopping link and the preset operation associated with opening the shopping link is recognized by the mobile application client, the mobile application client automatically uses the network to open the shopping link when the network status of the device satisfies the one or more predetermined network. In another example, if the stored graphic is associated with payment and the preset operation associated with submitting payment information is recognized by the mobile application client, the mobile application client automatically opens an interface to prompt the user of the device to submit the payment information when the network status of the device satisfies the one or more predetermined network.

In some embodiments, the mobile application client prompts the user of the device to execute the operation corresponding to the saved graphic code and/or content data carried in the graphic code when the network status of the device satisfies the one or more predetermined network. In some embodiments, the prompt information is any one of or a combination of: a prompt box, a prompt word, a prompt sound, a prompt light, or vibration. For example, in FIG. 5C, client device 104 displays prompt 540 on the interface of the mobile application client. In FIG. 5C, prompt 540 queries the user of client device 104 "Whether to follow CCTV news?" In FIG. 5C, the interface of the mobile application client also includes "Yes" option 542 and "No" option 544 for the user to choose whether to follow CCTV news.

In some embodiments, the mobile application client uses the network to execute the operation corresponding to the saved graphic code and/or content data carried in the graphic code after the user of the device authorizes execution of the operation. For example, in FIG. 5C, if the user chooses "Yes" option 542, the mobile application client follows CCTV news. In FIG. 5C, the mobile application client subsequently displays prompt 546 on user interface indicating that the following was successful.

As another example, in FIG. 5D, if the graphic code is a graphic code that includes payment information for a transaction, the mobile application client displays an interface 550 prompting the user of client device 104 to confirm the payment information when the network status of the device satisfies the one or more predetermined network. If the user submits the payment information, the mobile application client completes the payment operation. In FIG. 5D, after completing the payment operation, the mobile application client displays an interface 552 indicating that the payment was successful.

In some embodiments, in addition to performing the operation corresponding to the saved graphic code, the user of the device is also able to search for and manage saved graphic code, send saved graphic code to friends through the Internet, Bluetooth, or the like, and/or share the saved graphic code in the network (e.g., the social networking platform), so that other people can use the saved graphic code. In FIG. 5B, for example, the user of client device 104 is able to manage saved graphic codes 524, 528, and 532 via manage button 534.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIG. 7.

Figure 8A:
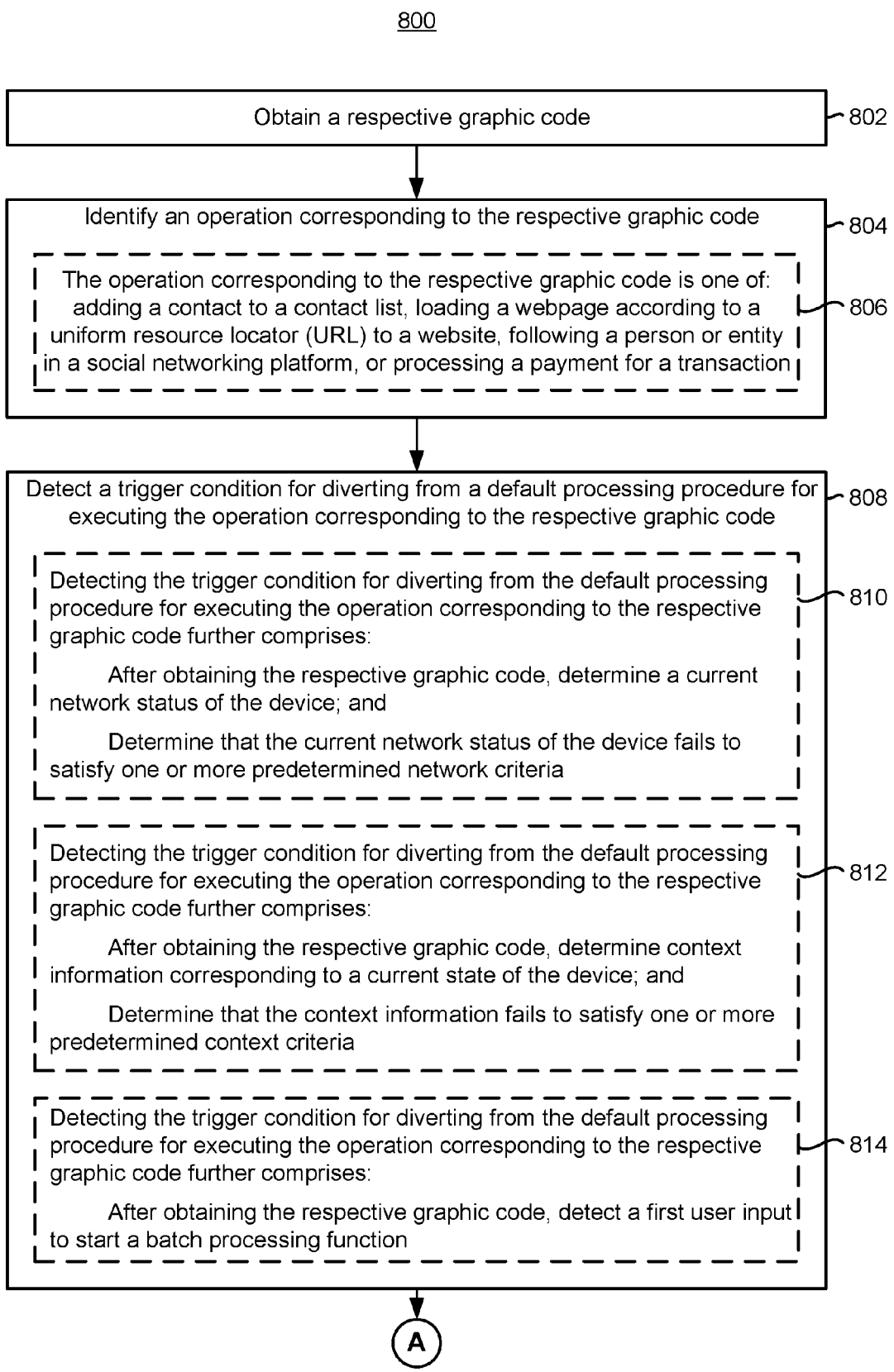
FIGS. 8A-8C illustrate a flowchart diagram of a method of graphic code processing in accordance with some embodiments.
Figure 8B:
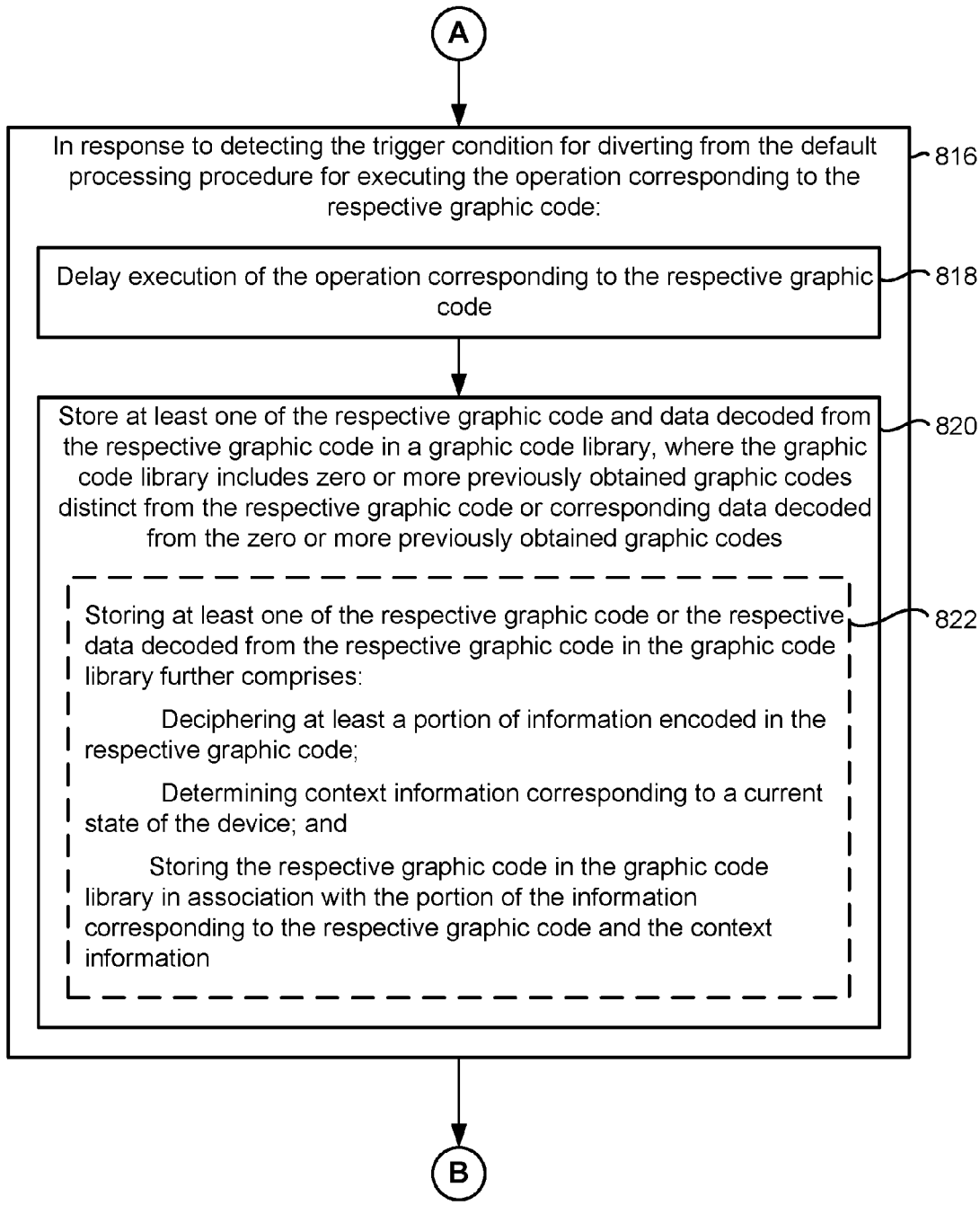
Figure 8C:
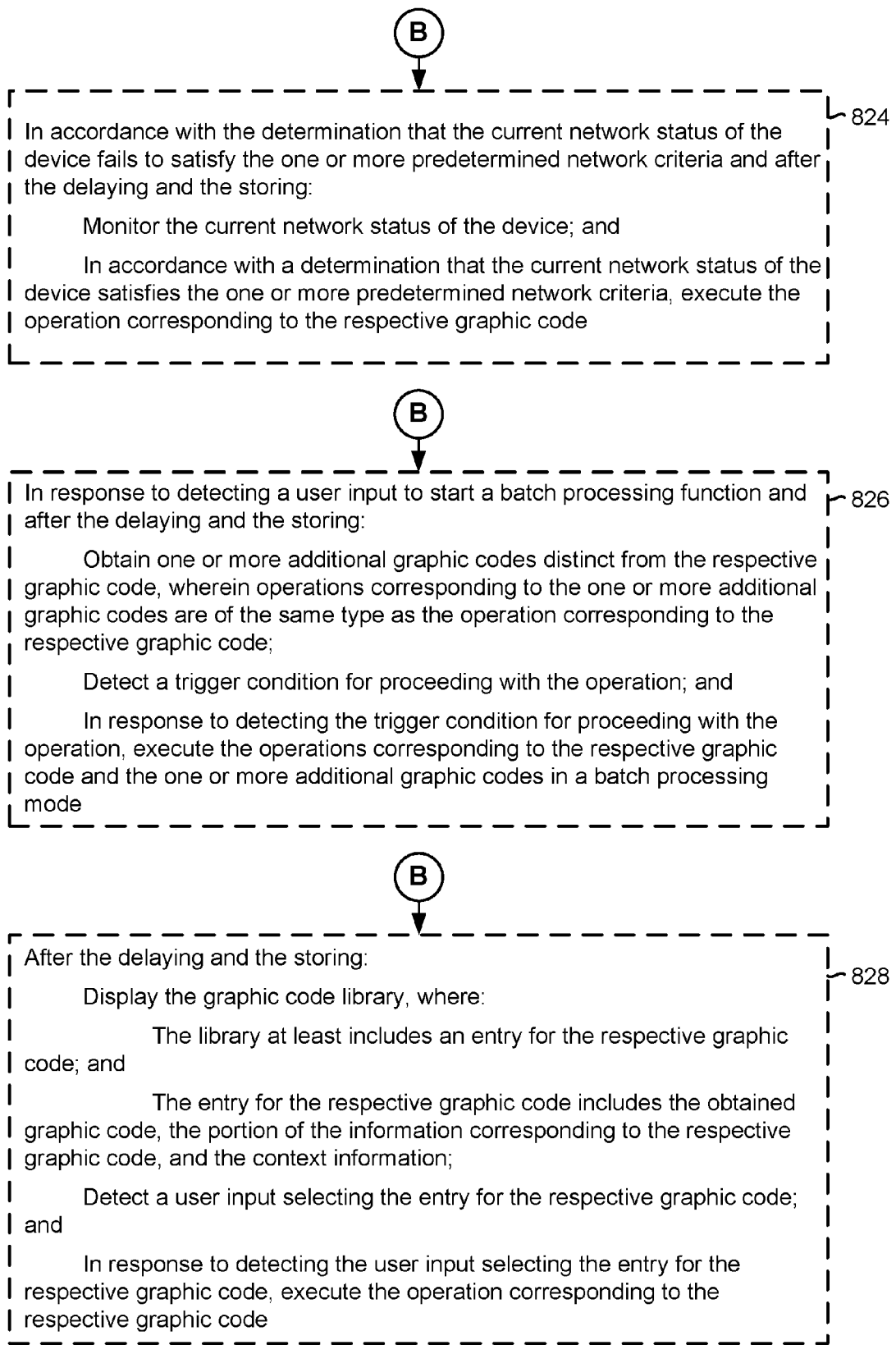

FIGS. 8A-8C illustrate a flowchart diagram of a method 800 of graphic code processing in accordance with some embodiments. In some embodiments, method 800 is performed by a device with one or more processors and memory. For example, in some embodiments, method 800 is performed by client device 104 (FIGS. 1 and 3) or a component thereof (e.g., graphics code processing module 105, FIGS. 1 and 3). In some embodiments, method 800 is governed by instructions that are stored in a non-transitory computer readable storage medium and the instructions are executed by one or more processors of the device. Optional operations are indicated by dashed lines (e.g., boxes with dashed-line borders).

The device obtains (802) a respective graphic code. In some embodiments, the graphic code is a two-dimensional code that is capable of carrying data information. For example, the graphic code is a QR code, barcode, SKU, or the like. In some embodiments, the graphic code is encoded according to a predetermined procedure. In some embodiments, the user of the device captures the graphic code using a camera of the device (e.g., a built-in camera of a mobile phone or a peripheral web-cam attached to a desktop or laptop computer). In some embodiments, the graphic code is received (e.g., via an e-mail, an SMS, a message or post sent through the social networking platform, or the like) from another user.

The device identifies (804) an operation corresponding to the respective graphic code. In some embodiments, client device 104 or a component thereof (e.g., identifying module 334, FIG. 3) identifies an operation corresponding to the graphic code For example, the operation requires access to the Internet such as adding a friend/contact, following a public account, processing a payment, opening a link, or the like.

In some embodiments, the operation corresponding to the respective graphic code is one of (806): adding a contact to a contact list (e.g., for a social networking platform or a phone book), loading a web page according to a uniform resource locator (URL) to a website, following a person or entity in a social networking platform, or processing a payment for a transaction. In one example, a first user wishes to share his/her contact information with a second user, and the second user scans a two-dimensional code corresponding to the first user. In this example, the operation that corresponds to the two-dimensional code is adding the first user as a contact in the second's user contact list and/or address book. In another example, a user sees a sees a two-dimensional code for a shopping link to a merchant's web site while reading a newspaper, and the user scans the two-dimensional code by using a camera of the user's mobile phone. In this example, the operation that corresponds to the shopping link is loading the merchant's website according to a URL encoded in the two-dimensional code. FIG. 5C, for example, shows client device 104 following a public account in the social networking platform for an entity (e.g., CCTV news). FIG. 5D, for example, shows client device 104 processing a payment for a transaction.

The device detects (808) a trigger condition for diverting from a default processing procedure for executing the operation corresponding to the respective graphic code. In some embodiments, prior to detecting the trigger condition and after obtaining the graphic code, the user attempts to perform the operation corresponding to the graphic code. For example, the user scans a QR code associated with an account in the social networking platform, and clicks on the captured QR code to follow the account. In some embodiments, prior to detecting the trigger condition and after obtaining the graphic code, the device automatically attempts to perform the operation corresponding to the graphic code (i.e., the operation corresponding to the graphic code is executed immediately or an attempt to execute the operation is made immediately). In some embodiments, after the user attempts to perform the operation corresponding to the graphic code or before the device automatically performs the operation corresponding to the graphic code, client device 104 or a component thereof (e.g., determining module 336, FIG. 3) determines whether a trigger condition is present.

In some embodiments, client device 104 or a component thereof (e.g., executing module 338, FIG. 3) executes the identified operation corresponding to the graphic code in accordance with a determination that the trigger condition is not present If the trigger condition is not present, the default processing procedure is followed. For example, the default processing procedure is to start the normal process for adding friends, following a public account, processing a payment, or opening a link immediately after the graphic code is obtained and the operation is determined. In the default processing procedure, if an error is encountered, the default processing procedure provides the appropriate response for the error conditions (e.g., show an error message, a broken link, etc.).

In some embodiments, the device detects the trigger condition for diverting from the default processing procedure for executing the operation corresponding to the respective graphic code by (810): after obtaining the respective graphic code, determining a current network status of the device; and determining that the current network status of the device fails to satisfy one or more predetermined network criteria. In some embodiments, client device 104 or a component thereof (e.g., network status module 342, FIG. 3) detects the trigger condition when the network status fails to satisfy one or more predetermined criteria (e.g., signal strength, type of network service, etc.). In this embodiment, detecting the trigger condition means obtaining the current network status and evaluating the current network status against the predetermined criteria.

In some embodiments, the device detects the trigger condition for diverting from the default processing procedure for executing the operation corresponding to the respective graphic code by (812): after obtaining the respective graphic code, determining context information corresponding to a current state of the device; and determining that the context information fails to satisfy one or more predetermined context criteria. In some embodiments, client device 104 or a component thereof (e.g., context information collecting module 344, FIG. 3) collects context information associated with a current state of client device 104 from one or more sensors 315 and other sources at the time the graphic code is obtained or after obtaining the graphic code. In some embodiments, client device 104 or a component thereof (e.g., determining module 336, FIG. 3) detects the trigger condition when the collected context information fails to satisfy one or more predetermined context criteria (e.g., a specified time/date, geographic location, etc.) For example, the operation should not be executed until a certain time on a certain day such as a prize giveaway. In another example, the operation should not be executed until the device is within a certain range of coordinates such as for a virtual scavenger hunt.

In some embodiments, the device detects the trigger condition for diverting from the default processing procedure for executing the operation corresponding to the respective graphic code by (814): after obtaining the respective graphic code, detecting a user input to start a batch processing function. In some embodiments, the trigger condition is detected when a user input indicates a batched operation. In this embodiment, detecting the trigger condition means detecting the user input requesting batch processing of the graphic code(s) that has been received or are yet to be received. For example, while at a party, the user of the device intends to add multiple people at the party to his/her contact list. However, the user wishes to delay adding and confirming the contacts until he/she is finished collecting/batching the multiple new contacts. In some embodiments, the user input for starting a batching processing operation can also be received before the first graphic code is received. In some embodiments, the batch processing function relates to processing graphic codes.

In response to detecting the trigger condition for diverting from the default processing procedure for executing the operation corresponding to the respective graphic code (816), the device: delays (818) execution of the operation corresponding to the respective graphic code; and stores (820) at least one of the respective graphic code and data decoded from the respective graphic code in a graphic code library, where the graphic code library includes zero or more previously obtained graphic codes distinct from the respective graphic code or corresponding data decoded from the zero or more previously obtained graphic codes. In some embodiments, client device 104 or a component thereof (e.g., diverting module 340, FIG. 3) delays execution of the identified operation corresponding to the graphic code and stores the graphic code in graphic code library 372 (FIG. 3) in accordance with a determination that the trigger condition is present.

In some embodiments, the device stores at least one of the respective graphic code or the respective data decoded from the respective graphic code in the graphic code library by (822): deciphering at least a portion of information encoded in the respective graphic code; determining context information corresponding to a current state of the device; and storing the respective graphic code in the graphic code library in association with the portion of the information corresponding to the respective graphic code and the context information. In some embodiments, client device 104 or a component thereof (e.g., deciphering module 346, FIG. 3) deciphers at least a portion of information encoded in the graphic code. For example, the portion of information includes a snippet of information related to the operation or a summary of the operation (e.g., retailer, transaction amount, items, etc. for a payment operation). In some embodiments, client device 104 or a component thereof (e.g., context information collecting module 344, FIG. 3) collects context information associated with a current state of client device 104 (e.g., time/date, geographic location, etc.) from one or more sensors 315 and other sources at the time the graphic code is obtained or after obtaining the graphic code.

In some embodiments, in accordance with the determination that the current network status of the device fails to satisfy the one or more predetermined network criteria and after the delaying and the storing, the device (824): monitors the current network status of the device; and, in accordance with a determination that the current network status of the device satisfies the one or more predetermined network criteria, executes the operation corresponding to the respective graphic code. In some embodiments, client device 104 or a component thereof (e.g., network status module 342, FIG. 3) monitors the network status of network communication module 318 (i.e., constantly or periodically checks whether the current network status of the device satisfies the one or more predetermined network criteria). For example, the device periodically checks the network status every X seconds (e.g., a predetermined number of seconds). In another example, the device only checks the network status again when the user selects the stored respective graphic code from the library.

In some embodiments, when the one or more predetermined network criteria are satisfied, the operation is automatically executed if current context information indicates that the graphic code was obtained less than K minutes ago and/or at a location less than Y km away from the current location of the device. In some embodiments, when the one or more predetermined network criteria are satisfied, the device prompts the user before executing the operation if current context information indicates that the graphic code was obtained more than K minutes ago and/or at a location more than Y km away from the current location of the device. In some embodiments, the device only prompts the user to confirm execution of an operation (e.g., a payment) when the current context information also indicates that the user is not in a crowded area/room with potential eavesdroppers or interlopers. In some embodiments, the device only prompts the user to confirm execution of an operation when the current context information also indicates that the user is not in motion (e.g., not running, driving, or cycling) so that the user has full attention to devout to the prompt and so as not distract the user with the prompt.

In some embodiments, in response to detecting a user input to start a batch processing function and after the delaying and the storing, the device (826): obtains one or more additional graphic codes distinct from the respective graphic code, where operations corresponding to the one or more additional graphic codes are of the same type as the operation corresponding to the respective graphic code; detects a trigger condition for proceeding with the operation; and, in response to detecting the trigger condition for proceeding with the operation, executes the operations corresponding to the respective graphic code and the one or more additional graphic codes in a batch processing mode. For example, the operation corresponds to adding multiple contacts to a contact list or following multiple entities in a social networking platform. In some embodiments, client device 104 or a component thereof (e.g., batch processing module 348, FIG. 3) detects the trigger condition for proceeding with the operation after the absence of an additional graphic code within M seconds, expiration of a time period of N seconds starting from the reception of the first user input, or a second user input ending the batch processing feature. In some embodiments, batch processing module 348 executes the operations corresponding to the respective graphic code and the one or more additional graphic codes in a batch processing mode after detecting the trigger condition for proceeding with the operation.

In some embodiments, after the delaying and the storing, the device (828): displays the graphic code library, where the library at least includes an entry for the respective graphic code, and the entry for the respective graphic code includes the obtained graphic code, the portion of the information corresponding to the respective graphic code, and the context information; detects a user input selecting the entry for the respective graphic code; and, in response to detecting the user input selecting the entry for the respective graphic code, executes the operation corresponding to the respective graphic code. In some embodiments, client device of a component thereof (e.g., displaying module 350, FIG. 3) displays graphic code library 372 (FIG. 3) that at least includes an entry for the respective graphic code with context information (e.g., the time/date the graphic code was obtained and the geographic location at which the graphic code was obtained) and information corresponding to the respective graphic code.

In FIG. 5B, for example, client device 104 displays a graphic code library 520 including a first saved graphic code 524, a second saved graphic code 528, and a third saved graphic code 532. For example, the user of client device 104 is able to execute an operation corresponding to the second saved graphic code 528 (i.e., following the public account of CCTV news in the social networking platform) by selecting the second saved graphic code 528 (e.g., via a tap gesture). In FIG. 5B, for example, the user of client device 104 is also able to manage saved graphic codes 524, 528, and 532 in graphic code library 520 via manage button 534. For example, manage button 534 enables the user of client device 104 to reorder, prioritize, change the related information, delete, or execute the saved graphic codes.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8C.

Figure 9:
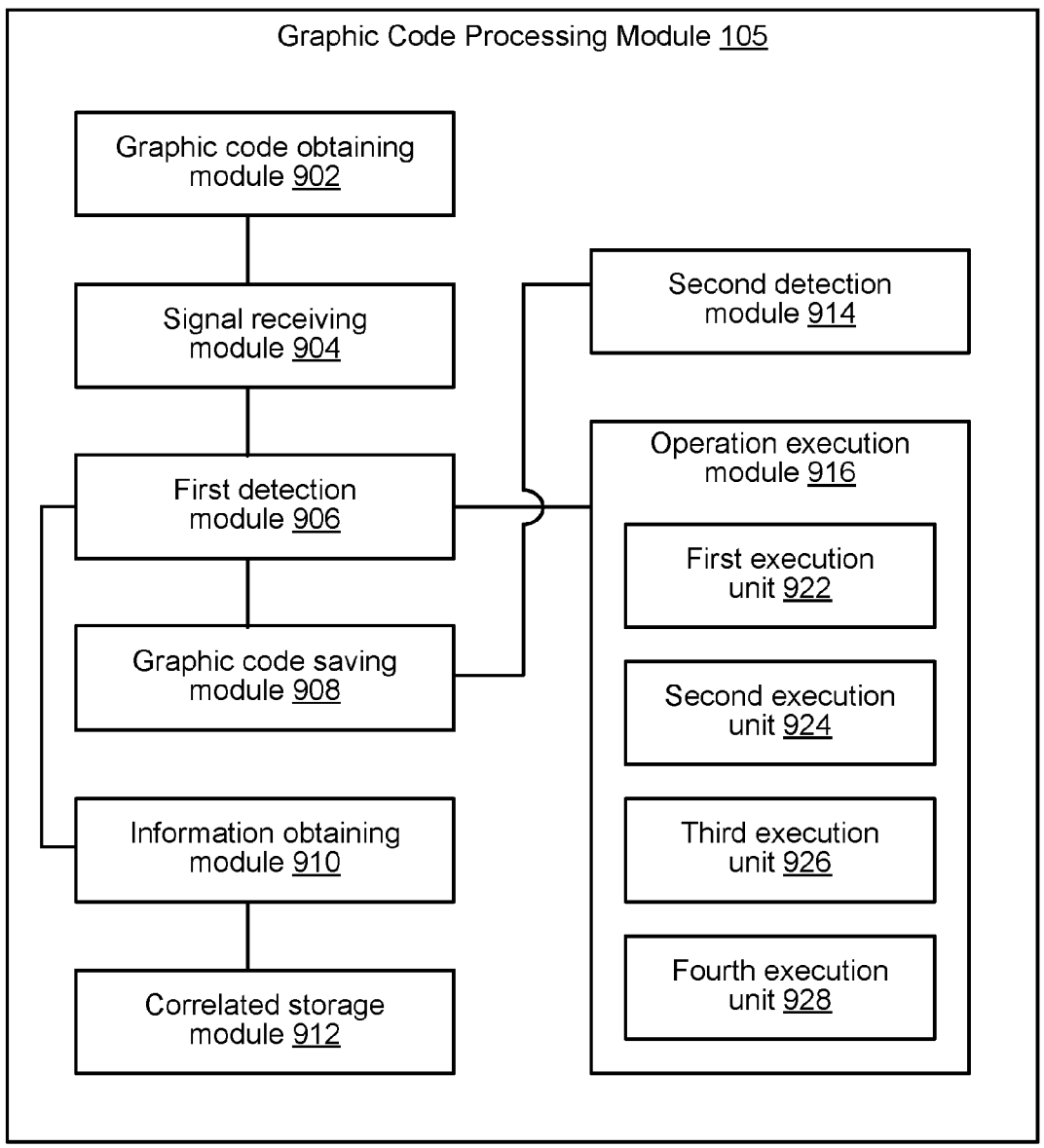
FIG. 9 is a block diagram of a graphic processing module in accordance with some embodiments.

FIG. 9 is a block diagram of a graphic processing module 105 in accordance with some embodiments. Graphic processing module 105 is executed on client device 104, and, in some embodiments, graphic processing module 105 is a component or feature of client-side module 102.

In some embodiments, graphic code obtaining module 902 is configured to obtain a graphic code. For example, the graphic code is a two-dimensional code or any other graphic code capable of carrying data information.

In some embodiments, signal receiving module 904 is configured to receive a trigger signal for executing a preset operation on the graphic code.

In some embodiments, first detection module 906 is configured to determine whether a network status of the device satisfies one or more predetermined network criteria when execution of the preset operation requires a network connection.

In some embodiments, graphic code saving module 908 is configured to save the graphic code and/or content data carried in the graphic code in accordance with a determination by first detection module 906 that the network status does not satisfy the one or more predetermined network criteria. In some embodiments, graphic code saving module 908 is configured to save the graphic code and/or content data carried in the graphic code in response to detecting a save signal. In some embodiments, graphic code saving module 908 saves the graphic code and/or the content data carried in the graphic code in a preset local storage location (e.g., graphic code library 372, FIG. 3) and/or a preset network storage location (e.g., one of external services 122, FIG. 1).

In some embodiments, graphic processing module 105 optionally includes second detection module 914, which is configured to determine whether a network status of the device satisfies one or more predetermined network criteria after a preset time (e.g., every X seconds).

In some embodiments, operation execution module 916 is configured to: execute the preset operation on the saved graphic code and/or content data carried in the graphic code using the network in accordance with a determination that the network status of the device satisfies the one or more predetermined network criteria.

In some embodiments, operation execution module 916 optionally includes: a first execution unit 922, a second execution unit 924, a third execution unit 926, and a fourth execution unit 928. The description uses an example in which operation execution module 916 includes the foregoing four execution units; however, depending on the circumstances operation execution module 916 may include any combination of one, two, three, or four execution units.

In some embodiments, first execution unit 922 is configured to: if the preset operation is a following operation, extract an identity of a followed object from the saved graphic code and/or content data carried in the graphic code, and send a following request to a server by using the network according to the extracted identity.

In some embodiments, second execution unit 924 is configured to: if the preset operation is a friend adding operation, extract an identity of a to-be-added friend from the saved graphic code and/or content data carried in the graphic code, and send a friend adding request to the server by using the network according to the extracted identity.

In some embodiments, third execution unit 926 is configured to: if the preset operation is a browsing operation, extract a link address from the saved graphic code and/or content data carried in the graphic code, and send a link content obtaining request to the server by using the network according to the extracted link address.

In some embodiments, fourth execution unit 928 is configured to: if the preset operation is a payment operation, extract payment information from the saved graphic code and/or content data carried in the graphic code, and send a payment request to the server by using the network according to the extracted payment information.

In some embodiments, graphic processing module 105 optionally includes an information obtaining module 910 and a correlated storage module 912.

In some embodiments, information obtaining module 910 is configured to obtain information related to the graphic code. For example, the related information includes at least one of: the time the graphic code was scanned/captured, the geographic location of the device when graphic code was scanned/captured, description information of the graphic code, a data source of the graphic code, and a preset operation corresponding to the graphic code.

In some embodiments, correlated storage module 912 is configured to correlate related information and the saved graphic code and/or content data carried in the graphic code.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of graphic code processing, comprising:
   at a device with one or more processors and memory:
   obtaining a respective graphic code;
   identifying an operation corresponding to the respective graphic code;
   detecting a first trigger condition and a second trigger condition for diverting from a default processing procedure for executing the operation corresponding to the respective graphic code, wherein the first trigger condition is based on a current network status of the device, and the second trigger condition is based on a current contextual state of the device that is distinct from the current network status of the device; and
   in response to detecting the first trigger condition and the second trigger condition for diverting from the default processing procedure for executing the operation corresponding to the respective graphic code:
   delaying execution of the operation corresponding to the respective graphic code; and
   storing at least one of the respective graphic code and data decoded from the respective graphic code in a graphic code library, wherein the graphic code library includes zero or more previously obtained graphic codes distinct from the respective graphic code or corresponding data decoded from the zero or more previously obtained graphic codes.

2. The method of claim 1, wherein detecting the first trigger condition for diverting from the default processing procedure for executing the operation corresponding to the respective graphic code further comprises:
   after obtaining the respective graphic code, determining the current network status of the device; and
   determining that the current network status of the device fails to satisfy one or more predetermined network criteria.

3. The method of claim 2, further comprising:
   after the delaying and the storing:
   monitoring the current network status of the device; and
   in accordance with at least a determination that the current network status of the device satisfies the one or more predetermined network criteria, executing the operation corresponding to the respective graphic code.

4. The method of claim 1, wherein detecting the second trigger condition for diverting from the default processing procedure for executing the operation corresponding to the respective graphic code further comprises:
   after obtaining the respective graphic code, determining context information corresponding to a current state of the device; and
   determining that the context information fails to satisfy one or more predetermined context criteria.

5. The method of claim 1, including:
   after obtaining the respective graphic code, detecting a user input to start a batch processing function.

6. The method of claim 5, further comprising:
   in response to detecting the user input:
   delaying execution of the operation corresponding to the respective graphic code; and
   storing at least one of the respective graphic code and the data decoded from the respective graphic code in the graphic code library;
   before executing the operation corresponding to the respective graphic code, obtaining one or more additional graphic codes distinct from the respective graphic code, wherein operations corresponding to the one or more additional graphic codes are of the same type as the operation corresponding to the respective graphic code;
   detecting a trigger condition for proceeding with the operation; and
   in response to detecting the trigger condition for proceeding with the operation, executing the operations corresponding to the respective graphic code and the one or more additional graphic codes in a batch processing mode.

7. The method of claim 1, wherein storing at least one of the respective graphic code or the respective data decoded from the respective graphic code in the graphic code library further comprises:
   deciphering at least a portion of information encoded in the respective graphic code;
   determining context information corresponding to a current state of the device; and
   storing the respective graphic code in the graphic code library in association with the portion of the information corresponding to the respective graphic code and the context information.

8. The method of claim 7, further comprising:
   after the delaying and the storing:
   displaying the graphic code library, wherein:
   the library at least includes an entry for the respective graphic code; and
   the entry for the respective graphic code includes the obtained graphic code, the portion of the information corresponding to the respective graphic code, and the context information;

detecting a user input selecting the entry for the respective graphic code; and in response to detecting the user input selecting the entry for the respective graphic code, executing the operation corresponding to the respective graphic code.

9. The method of claim 1, wherein the operation corresponding to the respective graphic code is one of: adding a contact to a contact list, loading a web page according to a uniform resource locator (URL) to a website, following a person or entity in a social networking platform, and processing a payment for a transaction.

10. A device, comprising:
one or more processors; and
memory storing one or more programs to be executed by the one or more processors, the one or more programs comprising instructions for:
obtaining a respective graphic code;
identifying an operation corresponding to the respective graphic code;
detecting a first trigger condition and a second trigger condition for diverting from a default processing procedure for executing the operation corresponding to the respective graphic code, wherein the first trigger condition is based on a current network status of the device, and the second trigger condition is based on a current contextual state of the device that is distinct from the current network status of the device; and
in response to detecting the first trigger condition and the second trigger condition for diverting from the default processing procedure for executing the operation corresponding to the respective graphic code:
delaying execution of the operation corresponding to the respective graphic code; and
storing at least one of the respective graphic code and data decoded from the respective graphic code in a graphic code library, wherein the graphic code library includes zero or more previously obtained graphic codes distinct from the respective graphic code or corresponding data decoded from the zero or more previously obtained graphic codes.

11. The device of claim 10, wherein detecting the first trigger condition for diverting from the default processing procedure for executing the operation corresponding to the respective graphic code further comprises:
after obtaining the respective graphic code, determining the current network status of the device; and
determining that the current network status of the device fails to satisfy one or more predetermined network criteria.

12. The device of claim 11, wherein the one or more programs further comprise instructions for:
after the delaying and the storing:
monitoring the current network status of the device; and
in accordance with at least a determination that the current network status of the device satisfies the one or more predetermined network criteria, executing the operation corresponding to the respective graphic code.

13. The device of claim 10, wherein detecting the second trigger condition for diverting from the default processing procedure for executing the operation corresponding to the respective graphic code further comprises:
after obtaining the respective graphic code, determining context information corresponding to a current state of the device; and
determining that the context information fails to satisfy one or more predetermined context criteria.

14. The device of claim 10, including:
after obtaining the respective graphic code, detecting a user input to start a batch processing function.

15. The device of claim 14, wherein the one or more programs further comprise instructions for:
in response to detecting the user input:
delaying execution of the operation corresponding to the respective graphic code: and
storing at least one of the respective graphic code and the data decoded from the respective graphic code in the graphic code library;
before executing the operation corresponding to the respective graphic code, obtaining one or more additional graphic codes distinct from the respective graphic code, wherein operations corresponding to the one or more additional graphic codes are of the same type as the operation corresponding to the respective graphic code;
detecting a trigger condition for proceeding with the operation; and
in response to detecting the trigger condition for proceeding with the operation, executing the operations corresponding to the respective graphic code and the one or more additional graphic codes in a batch processing mode.

16. A non-transitory computer readable storage medium storing one or more programs, the one or more programs comprising instructions, which, when executed by a device with one or more processors, cause the device to perform operations comprising:
obtaining a respective graphic code;
identifying an operation corresponding to the respective graphic code;
detecting a first trigger condition and a second trigger condition for diverting from a default processing procedure for executing the operation corresponding to the respective graphic code, wherein the first trigger condition is based on a current network status of the device, and the second trigger condition is based on a current contextual state of the device that is distinct from the current network status of the device; and
in response to detecting the first trigger condition and the second trigger condition for diverting from the default processing procedure for executing the operation corresponding to the respective graphic code:
delaying execution of the operation corresponding to the respective graphic code; and
storing at least one of the respective graphic code and data decoded from the respective graphic code in a graphic code library, wherein the graphic code library includes zero or more previously obtained graphic codes distinct from the respective graphic code or corresponding data decoded from the zero or more previously obtained graphic codes.

17. The non-transitory computer readable storage medium of claim 16, wherein detecting the first trigger condition for diverting from the default processing procedure for executing the operation corresponding to the respective graphic code further comprises:

after obtaining the respective graphic code, determining the current network status of the device; and determining that the current network status of the device fails to satisfy one or more predetermined network criteria.

18. The non-transitory computer readable storage medium of claim 16, wherein detecting the second trigger condition for diverting from the default processing procedure for executing the operation corresponding to the respective graphic code further comprises:

after obtaining the respective graphic code, determining context information corresponding to a current state of the device; and determining that the context information fails to satisfy one or more predetermined context criteria.

19. The non-transitory computer readable storage medium of claim 16, wherein the operations further comprise:

after obtaining the respective graphic code, detecting a user input to start a batch processing function.

20. The non-transitory computer readable storage medium of claim 19, wherein the instructions cause the device to perform operations further comprising:

in response to detecting the user input:

delaying execution of the operation corresponding to the respective graphic code: and storing at least one of the respective graphic code and the data decoded from the respective graphic code in the graphic code library;

before executing the operation corresponding to the respective graphic code, obtaining one or more additional graphic codes distinct from the respective graphic code, wherein operations corresponding to the one or more additional graphic codes are of the same type as the operation corresponding to the respective graphic code;

detecting a trigger condition for proceeding with the operation; and in response to detecting the trigger condition for proceeding with the operation, executing the operations corresponding to the respective graphic code and the one or more additional graphic codes in a batch processing mode.

* * * * *